US012659798B2

(12) United States Patent
Yu et al.

(10) Patent No.: US 12,659,798 B2
(45) Date of Patent: Jun. 16, 2026

(54) DATA TRANSMISSION METHOD AND APPARATUS

(71) Applicant: HUAWEI TECHNOLOGIES CO., LTD., Shenzhen (CN)

(72) Inventors: Tianhang Yu, Hangzhou (CN); Jian Wang, Hangzhou (CN); Chen Xu, Hangzhou (CN); Gongzheng Zhang, Hangzhou (CN); Rong Li, Hangzhou (CN); Jun Wang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 426 days.

(21) Appl. No.: 18/308,423

(22) Filed: Apr. 27, 2023

(65) Prior Publication Data

US 2023/0319632 A1 Oct. 5, 2023

Related U.S. Application Data

(63) Continuation of application No. PCT/CN2021/126973, filed on Oct. 28, 2021.

(30) Foreign Application Priority Data

Oct. 28, 2020 (CN) .......................... 202011169163.4

(51) Int. Cl.
| | |
|---|---|
| *H04W 28/06* | (2009.01) |
| *G06N 7/01* | (2023.01) |
| *H04L 1/00* | (2006.01) |

(52) U.S. Cl.
CPC .............. *H04W 28/06* (2013.01); *G06N 7/01* (2023.01); *H04L 1/0036* (2013.01)

(58) Field of Classification Search
CPC ......... H04W 28/06; G06N 7/01; G06N 3/094; G06N 3/088; G06N 20/10; G06N 3/047;
(Continued)

(56) References Cited

U.S. PATENT DOCUMENTS

2019/0373404 A1* 12/2019 Katsu ..................... G06N 99/00
2020/0244969 A1 7/2020 Bhorkar
(Continued)

FOREIGN PATENT DOCUMENTS

| CN | 105763287 A | 7/2016 |
|---|---|---|
| CN | 111669587 A | 9/2020 |

*Primary Examiner* — Obaidul Huq
(74) *Attorney, Agent, or Firm* — Leydig, Voit & Mayer, Ltd.

(57) ABSTRACT

A data transmission method and apparatus are described. The method includes a receive end receiving a first parameter, where the first parameter includes a parameter of a probability distribution of a hidden variable. The hidden variable is obtained by encoding first data by using an encoder of a variational auto-encoder. The receive end determines the probability distribution based on the first parameter, and samples the probability distribution M times to obtain M pieces of sampled data, where M is a positive integer. The receive end reconstructs the first data based on the M pieces of sampled data. According to the described data transmission method and apparatus, the first parameter is transmitted, so that the receive end can support a plurality of times of sampling, thereby reducing an amount of data transmitted over an air interface, and reducing data transmission overhead.

6 Claims, 4 Drawing Sheets

(58) Field of Classification Search
CPC .... G06N 3/0475; G06N 3/0455; G06N 3/084;
H04L 1/0036; H04L 1/0026; H04L 1/00;
H04L 5/00; H04L 1/0015; H04L 5/0053;
H04B 7/06; H04B 7/0626; G06F 18/23
USPC ........................................................ 370/310
See application file for complete search history.

(56) References Cited

U.S. PATENT DOCUMENTS

| 2021/0327074 | A1* | 10/2021 | Schwing | B60W 30/0956 |
| 2023/0004779 | A1* | 1/2023 | Kamata | G06N 3/0455 |
| 2023/0351643 | A1* | 11/2023 | Tanaka | G06V 10/764 |
| 2023/0378976 | A1* | 11/2023 | Mizutani | H04Q 9/00 |

* cited by examiner

100

200

300

DATA TRANSMISSION METHOD AND APPARATUS

CROSS-REFERENCE TO RELATED APPLICATIONS

This application is a continuation of International Application No. PCT/CN2021/126973, filed on Oct. 28, 2021, which claims priority to Chinese Patent Application No. 202011169163.4, filed on Oct. 28, 2020. The disclosures of the aforementioned applications are hereby incorporated by reference in their entireties.

TECHNICAL FIELD

This application relates to the communication field, and more specifically, to a data transmission method and apparatus.

BACKGROUND

With continuous evolution of a form and an application scenario of a wireless network, a requirement for data transmission in the network increases sharply, and data becomes more diversified. For example, in a massive machine-type communication (mMTC) scenario, a large quantity of diversified devices access the network, and a data transmission amount increases sharply. For another example, in a millimeter-wave ultra-large-scale antenna system, accurate channel state information (CSI) is required for precoding at a transmit end. However, when a quantity of antennas is large, a CSI feedback data amount is huge. In this case, an efficient and more flexible data compression and transmission solution is required.

A variational auto-encoder (VAE) may be used for data compression and feature extraction, and has been used in wireless communication scenarios such as joint source and channel coding and CSI compression feedback. However, in an actual application of a joint source and channel coding scheme, only one-time sampling is performed on distribution of hidden variables at the transmit end, the sampled data is transmitted to a receive end through a channel, and the receive end obtains reconstructed data by using a decoder based on a result of the one-time sampling. In an existing method, a probability model cannot be fully used for the one-time sampling of distribution. To improve precision, sampling needs to be performed at the transmit end for a plurality of times, and sampled data of each time needs to be separately transmitted to the receive end. A plurality of times of data transmission causes a large data transmission amount and high overheads.

An artificial intelligence (AI) technology has achieved good results in many fields such as computer vision. A large amount of available data, more computing power, greater flexibility of neural networks, and lower online reasoning complexity provide a possibility for application of the artificial intelligence technology in wireless communication systems. A large amount of data is required for neural network training. A training problem of a neural network module needs to be considered when the neural network module is deployed in a network, and transmission of the training data requires a large quantity of overheads.

Therefore, transmitting a large amount of data in a communication network occupies a large quantity of transmission resources, which is an urgent problem to be resolved.

SUMMARY

This application provides a data transmission method and apparatus. When a large amount of data needs to be transmitted, a receive end can support a plurality of times of sampling by using a parameter for transmitting data, so that the large amount of data does not need to be transmitted, and data transmission overheads can be reduced.

According to a first aspect, a data transmission method is provided. The method includes: A receive end receives a first parameter, where the first parameter includes a parameter of a probability distribution of a hidden variable, and the hidden variable is obtained by encoding first data by using an encoder of a variational auto-encoder; the receive end determines the probability distribution based on the first parameter; the receive end samples the probability distribution for M times, to obtain M pieces of sampled data, where M is a positive integer; and the receive end reconstructs the first data based on the M pieces of sampled data.

Therefore, in this embodiment of this application, a first parameter is transmitted, so that a receive end can generate a probability distribution of a hidden variable based on the first parameter, to sample the probability distribution for a plurality of times, thereby reducing an amount of data transmitted over an air interface and reducing overheads.

With reference to the first aspect, in some implementations of the first aspect, that the receive end reconstructs the first data based on the M pieces of sampled data includes: The receive end separately decodes the M pieces of sampled data by using a decoder of the variational auto-encoder, to obtain M pieces of second data; and the receive end determines reconstructed first data based on the M pieces of second data. That the receive end determines reconstructed first data based on the M pieces of second data includes: The receive end averages the M pieces of second data, and uses an averaging result as the reconstructed first data; the receive end performs selection on the M pieces of second data, and uses a selection result as the reconstructed first data; or the receive end averages the M pieces of second data to obtain third data, and the receive end performs a decision on the third data, and uses a decision result as the reconstructed first data.

In this case, the receive end may separately decode data sampled for a plurality of times, and process the decoded data, to obtain reconstructed first data, so that the receive end can support a plurality of times of sampling in a case of one transmission, and determine the reconstructed first data based on a result of the plurality of times of sampling.

With reference to the first aspect, in some implementations of the first aspect, before the receive end receives the first parameter, the method further includes: The receive end sends first indication information, where the first indication information indicates a transmit end to send the first parameter.

In this case, the receive end may determine, based on a factor such as a processing capability of the receive end or a precision requirement for reconstructing data, that data that can be received is the first parameter, and send the first indication information to the transmit end, to indicate the transmit end to send the first parameter.

With reference to the first aspect, in some implementations of the first aspect, the method further includes: The receive end receives second indication information, where the second indication information indicates the receive end to sample the probability distribution. That the receive end samples the probability distribution for M times includes: The receive end samples the probability distribution for the M times based on the second indication information.

In this case, if the transmit end determines to send the first parameter, the transmit end may send the second indication information to the receive end, to indicate the receive end to sample the probability distribution. After receiving the second indication information, the receive end may sample the probability distribution for the M times based on the second indication information.

According to a second aspect, a data transmission method is provided. The method includes: A transmit end determines first data; the transmit end determines a first parameter based on the first data, where the first parameter includes a parameter of a probability distribution of a hidden variable, and the hidden variable is obtained by encoding the first data by using an encoder of a variational auto-encoder; and the transmit end sends the first parameter.

Therefore, in this embodiment of this application, a first parameter is transmitted, so that a receive end can support a plurality of times of sampling, and determine reconstructed first data based on a result of the plurality of times of sampling, thereby reducing an amount of data transmitted over an air interface, and reducing overheads.

With reference to the second aspect, in some implementations of the second aspect, the method further includes: The transmit end receives first indication information, where the first indication information indicates the transmit end to send the first parameter. That the transmit end sends the first parameter includes: The transmit end sends the first parameter based on the first indication information.

With reference to the second aspect, in some implementations of the second aspect, the method further includes: The transmit end sends second indication information, where the second indication information indicates a receive end to sample the probability distribution.

According to a third aspect, a data transmission method is provided. The method includes: A receive end receives a first parameter, where the first parameter includes a characteristic parameter of a function, the function is obtained by modeling data in a first dataset, and the first dataset includes at least one piece of to-be-sent data; the receive end determines the function based on the first parameter; and the receive end samples the function for M times, to reconstruct the data in the first dataset, where M is a positive integer.

Therefore, in this embodiment of this application, a first parameter is transmitted, so that a receive end can determine a function based on the first parameter, sample the function for a plurality of times, and use data sampled for the plurality of times as reconstructed data in a first dataset. Therefore, original data does not need to be transmitted, and overheads can be reduced.

With reference to the third aspect, in some implementations of the third aspect, the function includes a Gaussian mixture model, and the first parameter includes at least one of a mean vector, a covariance matrix, or a mixing coefficient of the Gaussian mixture model.

With reference to the third aspect, in some implementations of the third aspect, the function includes a generative adversarial network GAN, and the first parameter includes at least one of a weight or a bias of the GAN.

With reference to the third aspect, in some implementations of the third aspect, the first parameter further includes a quantity N of pieces of data in the first dataset, and N is a positive integer.

In this case, a transmit end may send a quantity of pieces of original data, and a quantity of pieces of data generated by a receive end is a multiple of the quantity of pieces of original data. In this way, the data can be better used for training.

With reference to the third aspect, in some implementations of the third aspect, the method further includes: The receive end sends first indication information, where the first indication information indicates a transmit end to send the first parameter.

In this case, the receive end may determine, based on a factor such as a processing capability of the receive end or a precision requirement for data transmission, that data that can be received is the first parameter, and send the first indication information to the transmit end, to indicate the transmit end to send the first parameter.

With reference to the third aspect, in some implementations of the third aspect, the method further includes: The receive end receives second indication information, where the second indication information indicates the receive end to sample a probability distribution. That the receive end samples the probability distribution for M times includes: The receive end samples the probability distribution for the M times based on the second indication information.

In this case, if the transmit end determines to send the first parameter, the transmit end may send the second indication information to the receive end, to indicate the receive end to sample the probability distribution. After receiving the second indication information, the receive end may sample the probability distribution for the M times based on the second indication information.

According to a fourth aspect, a data transmission method is provided. The method includes: A transmit end determines a first dataset, where the first dataset includes at least one piece of to-be-sent data; the transmit end determines a first parameter based on the first dataset, where the first parameter includes a characteristic parameter of a function, and the function is obtained by modeling the data in the first dataset; and the transmit end sends the first parameter.

Therefore, in this embodiment of this application, a first parameter is transmitted, so that a receive end can support a plurality of times of sampling, and use data sampled for the plurality of times as reconstructed data in a first dataset. Therefore, original data does not need to be transmitted, and overheads can be reduced.

With reference to the fourth aspect, in some implementations of the fourth aspect, the function includes a Gaussian mixture model, and the first parameter includes at least one of a mean vector, a covariance matrix, or a mixing coefficient of the Gaussian mixture model.

With reference to the fourth aspect, in some implementations of the fourth aspect, the function includes a generative adversarial network GAN, and the first parameter includes at least one of a weight or a bias of the GAN.

With reference to the fourth aspect, in some implementations of the fourth aspect, the first parameter further includes a quantity N of pieces of data in the first dataset, and N is a positive integer.

With reference to the fourth aspect, in some implementations of the fourth aspect, the method further includes: The transmit end receives first indication information, where the first indication information indicates the transmit end to send the first parameter. That the transmit end sends the first parameter includes: The transmit end sends the first parameter based on the first indication information.

With reference to the fourth aspect, in some implementations of the fourth aspect, the method further includes: The transmit end sends second indication information, where the second indication information indicates a receive end to sample a probability distribution.

With reference to the fourth aspect, in some implementations of the fourth aspect, before the transmit end determines the first dataset, the method further includes: The transmit end determines a second dataset, where the second dataset includes at least one piece of to-be-sent data; the transmit end clusters the data in the second dataset to obtain S data subsets, where S is a positive integer; and the transmit end separately determines the S data subsets as the first dataset.

In this case, the transmit end may cluster the to-be-sent data in the second dataset based on a status of the data in the second dataset, and then separately determine the clustered data as the first dataset. In this way, accuracy of sampling by the receive end can be further improved while transmission resources are saved.

With reference to the fourth aspect, in some implementations of the fourth aspect, the method further includes: The transmit end sends at least one piece of first data, and correspondingly, the receive end receives the at least one piece of first data.

In this embodiment of this application, the data received by the receive end further includes some data in the first dataset. The receive end uses the data and the data obtained by the receive end through sampling as a real sample for neural network training. In this way, authenticity of a training result can be improved.

According to a fifth aspect, a data transmission apparatus is provided. The apparatus includes: a transceiver unit, configured to receive a first parameter, where the first parameter includes a parameter of a probability distribution of a hidden variable, and the hidden variable is obtained by encoding first data by using an encoder of a variational auto-encoder; and a processing unit, configured to: determine the probability distribution based on the first parameter. The processing unit is further configured to sample the probability distribution for M times, to obtain M pieces of sampled data, where M is a positive integer. The processing unit is further configured to reconstruct the first data based on the M pieces of sampled data.

With reference to the fifth aspect, in some implementations of the fifth aspect, the processing unit is specifically configured to: separately decode the M pieces of sampled data by using a decoder of the variational auto-encoder, to obtain M pieces of second data; and average the M pieces of second data, and use an averaging result as reconstructed first data; perform selection on the M pieces of second data, and use a selection result as the reconstructed first data; or average the M pieces of second data to obtain third data, perform a decision on the third data, and use a decision result as the reconstructed first data.

With reference to the fifth aspect, in some implementations of the fifth aspect, the transceiver unit is further configured to send first indication information, where the first indication information indicates a transmit end to send the first parameter.

With reference to the fifth aspect, in some implementations of the fifth aspect, the transceiver unit is further configured to receive second indication information, where the second indication information indicates a receive end to sample the probability distribution.

According to a sixth aspect, a data transmission apparatus is provided. The apparatus includes: a processing unit, configured to determine a first data, where the processing unit is further configured to determine a first parameter based on the first data, where the first parameter includes a parameter of a probability distribution of a hidden variable, and the hidden variable is obtained by encoding the first data by using an encoder of a variational auto-encoder; and a transceiver unit, configured to send the first parameter.

With reference to the sixth aspect, in some implementations of the sixth aspect, the transceiver unit is further configured to receive first indication information, where the first indication information indicates a transmit end to send the first parameter.

With reference to the sixth aspect, in some implementations of the sixth aspect, the transceiver unit is further configured to send second indication information, where the second indication information indicates a receive end to sample the probability distribution.

According to a seventh aspect, a data transmission apparatus is provided. The apparatus includes: a transceiver unit, configured to receive a first parameter, where the first parameter includes a characteristic parameter of a function, the function is obtained by modeling data in a first dataset, and the first dataset includes at least one piece of to-be-sent data; and a processing unit, configured to determine the function based on the first parameter. The processing unit is further configured to sample the function for M times, to reconstruct the data in the first dataset, where M is a positive integer.

With reference to the seventh aspect, in some implementations of the seventh aspect, the function includes a Gaussian mixture model, and the first parameter includes at least one of a mean vector, a covariance matrix, or a mixing coefficient of the Gaussian mixture model.

With reference to the seventh aspect, in some implementations of the seventh aspect, the function includes a generative adversarial network GAN, and the first parameter includes at least one of a weight or a bias of the GAN.

With reference to the seventh aspect, in some implementations of the seventh aspect, the first parameter further includes a quantity N of pieces of data in the first dataset, and N is a positive integer.

With reference to the seventh aspect, in some implementations of the seventh aspect, the transceiver unit is further configured to send first indication information, where the first indication information indicates a transmit end to send the first parameter.

With reference to the seventh aspect, in some implementations of the seventh aspect, the transceiver unit is further configured to receive second indication information, where the second indication information indicates a receive end to sample a probability distribution.

According to an eighth aspect, a data transmission apparatus is provided. The apparatus includes: a processing unit, configured to determine a first dataset, where the first dataset includes at least one piece of to-be-sent data, and the processing unit is further configured to determine a first parameter based on the first dataset, where the first parameter includes a characteristic parameter of a function, and the function is obtained by modeling the data in the first dataset; and a transceiver unit, configured to send the first parameter.

With reference to the eighth aspect, in some implementations of the eighth aspect, the function includes a Gaussian mixture model, and the first parameter includes at least one of a mean vector, a covariance matrix, or a mixing coefficient of the Gaussian mixture model.

With reference to the eighth aspect, in some implementations of the eighth aspect, the function includes a generative adversarial network GAN, and the first parameter includes at least one of a weight or a bias of the GAN.

With reference to the eighth aspect, in some implementations of the eighth aspect, the first parameter further includes a quantity N of pieces of data in the first dataset, and N is a positive integer.

With reference to the eighth aspect, in some implementations of the eighth aspect, the transceiver unit is further configured to send first indication information, where the first indication information indicates a transmit end to send the first parameter.

With reference to the eighth aspect, in some implementations of the eighth aspect, the transceiver unit is further configured to receive second indication information, where the second indication information indicates a receive end to sample a probability distribution.

With reference to the eighth aspect, in some implementations of the eighth aspect, the processing unit is further configured to: determine a second dataset, where the second dataset includes at least one piece of to-be-sent data; cluster the data in the second dataset to obtain S data subsets, where S is a positive integer; and separately determine the S data subsets as the first dataset.

According to a ninth aspect, a communication system is provided, including a transmit end and a receive end. The receive end is configured to perform the method in the implementations of the first aspect or the third aspect, and the transmit end is configured to perform the method in the implementations of the second aspect or the fourth aspect.

According to a tenth aspect, a computer program product is provided. The computer program product includes a computer program (which may also be referred to as code or instructions). When the computer program is run, a computer is enabled to perform the method according to any one of the first aspect to the fourth aspect and the possible implementations of the first aspect to the fourth aspect.

According to an eleventh aspect, a computer-readable medium is provided. The computer-readable medium stores a computer program (which may also be referred to as code or instructions). When the computer program is run on a computer, the computer is enabled to perform the method according to any one of the first aspect to the fourth aspect and the possible implementations of the first aspect to the fourth aspect.

According to a twelfth aspect, a chip system is provided, including a memory and a processor. The memory is configured to store a computer program, and the processor is configured to invoke the computer program from the memory and run the computer program, so that a communication device on which the chip system is installed performs the method in any one of the first aspect to the fourth aspect and the possible implementations of the first aspect to the fourth aspect.

The chip system may include an input circuit or interface configured to send information or data, and an output circuit or interface configured to receive information or data.

DESCRIPTION OF EMBODIMENTS

Figure 1:
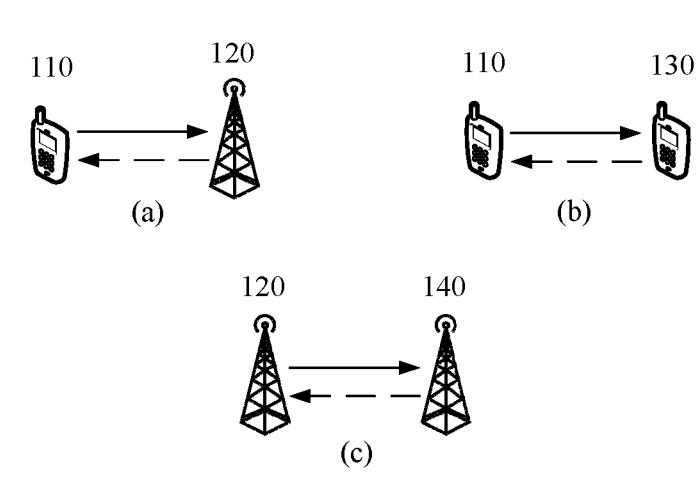
FIG. 1 is a schematic diagram of three application scenarios according to an embodiment of this application.

The following describes technical solutions of this application with reference to accompanying drawings.

The technical solutions in embodiments of this application may be applied to various communication systems, for example, a global system for mobile communication (GSM), a code division multiple access (CDMA) system, a wideband code division multiple access (WCDMA) system, a general packet radio service (GPRS) system, a Long Term Evolution (LTE) system, an LTE frequency division duplex (FDD) system, an LTE time division duplex (TDD) system, a universal mobile telecommunication system (UMTS), a Worldwide Interoperability For Microwave Access (WiMAX) communication system, a narrowband Internet of Things (NB-IoT) system, a 5th generation (5G) system or new radio (NR) system, three application scenarios of a 5G mobile communication system (namely, enhanced mobile broadband, eMBB), ultra-reliable and ultra-low latency communication (URLLC), and enhanced machine type communication (eMTC)), and a communication system that may appear in the future.

A data transmission method in this application may be used for data transmission between a transmit end and a receive end. The transmit end in embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in embodiments of this application. The transmit end in embodiments of this application may alternatively be a network device, and the network device may be a radio access network (radio access network, RAN) device. The RAN device may include various types of base stations. For example, the base stations in embodiments of this application may include macro base stations, micro base stations, relay stations, access points, and the like in various forms. In systems using different radio access technologies, names of devices that have a base station function may be different. For example, in an LTE network, a device with a base station function is referred to as an evolved NodeB (eNB or eNodeB), and in a 3rd generation (3G) network, a device with a base station function is referred to as aNodeB. In a 5th generation (5G)network, a device with abase station function is referred to as a gNodeB (g NodeB, gNB) or the like. This is not limited in embodiments of this application.

The receive end in embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in embodiments of this application. The receive end in embodiments of this application may alternatively be a network device, and the network device may be a radio access network (RAN) device. The RAN device may include various types of base stations. For example, the base stations in embodiments of this application may include macro base stations, micro base stations, relay stations, access points, and the like in various forms. In systems using different radio access technologies, names of devices that have a base station function may be different. For example, in an LTE network, a device with a base station function is referred to as an evolved NodeB (eNB or eNodeB), and in a 3rd generation (3G) network, a device with a base station function is referred to as a NodeB. In a 5th generation (5G) network, a device with a base station function is referred to as a gNodeB (g NodeB, gNB) or the like. This is not limited in embodiments of this application.

FIG. 1 is a schematic diagram of using a communication system 100 according to this application. As shown in FIG. 1(a), the communication system 100 may include a terminal device 110 and a network device 120. For specific descriptions of the terminal device 110 and the network device 120, refer to the foregoing related descriptions. The terminal device may access a network by using the network device, and the terminal device and the network device may communicate with each other through a radio link. As shown in FIG. 1(b), the communication system 100 may include the terminal device 110 and a terminal device 130. The terminal device 110 and the terminal device 130 perform data transmission through a device-to-device (D2D) link. The D2D link, also referred to as a sidelink (sidelink), is a link over which two devices directly communicate with each other without using a third party. As shown in FIG. 1(c), the communication system 100 may include the network device 120 and a network device 140. The network device 120 and the network device 140 perform transmission through a device-to-device D2D link.

Therefore, the data transmission method in this application may be used for communication between a network device and a terminal device, or may be used for communication between network devices, or may be used for communication between terminal devices. The three application scenarios in FIG. 1 are merely used as examples. This is not limited in this application.

Figure 2:
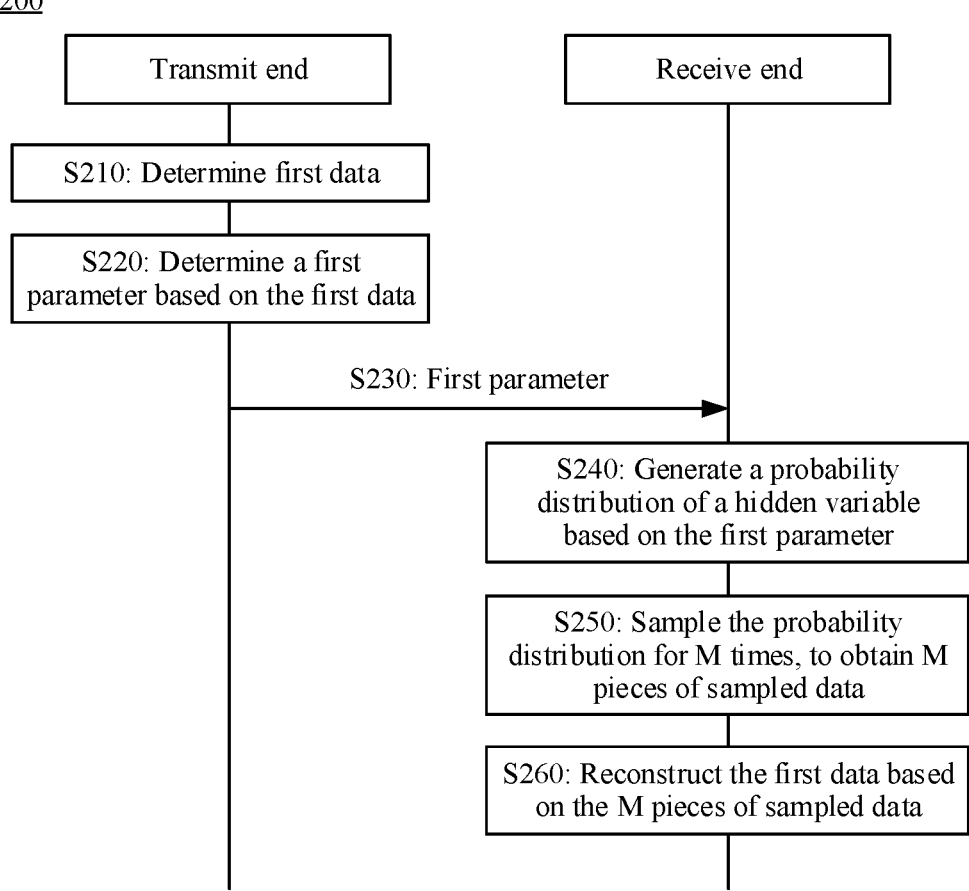
FIG. 2 is a schematic flowchart of a data transmission method according to an embodiment of this application.

FIG. 2 is a schematic flowchart of a data transmission method 200 according to an embodiment of this application. Before the method is used, an encoder and a decoder are first jointly trained based on a VAE, in other words, the encoder and the decoder jointly form a neural network, and are jointly trained. A trained decoder may decode a result output by the encoder, to reconstruct input data of the encoder. A trained encoder and the trained decoder are respectively built in a transmit end and a receive end. It should be noted that there may be one or more encoders of the VAE, and similarly, there may be one or more decoders of the VAE. In other words, the encoder and the decoder are obtained through joint training, but it does not mean that a quantity of encoders and a quantity of decoders are definitely the same. The quantity of encoders and the quantity of decoders are not limited in this embodiment.

A training process of the VAE is to maximize an expectation $E(\log p_\theta(x))$ of a marginal log-likelihood probability $\log p_\theta(x)$, in other words, to maximize a probability that reconstructed data is equal to sent data.

A lower bound of a variation of $\log p_\theta(x)$ is obtained through calculation:

$$\log p_\theta(x) \geq -D_{KL}(q^\phi(z|x)\|p_\theta(z)) + E_{q_\phi(Z|X)}\log p_\theta(x|j\,z)]$$

$\phi$ is a parameter of the encoder of the VAE, and $\theta$ is a parameter of the decoder of the VAE. x represents a sample of input original data, $p_\theta(x)$ represents a probability of outputting data x by the decoder of the VAE, z represents a hidden variable of the original data, a probability distribution of the hidden variable is $p_\theta(z)$, $q_\phi(z|x)$ represents an approximate conditional probability distribution of z when x is given for the encoder of the VAE, $p_\theta(x|z)$ represents a conditional probability distribution of x when z is known for the decoder of the VAE, $D_{KL}$ represents a Kullback-Leibler divergence, and E represents an expectation of a corresponding variable. Optimizing the VAE is to maximize $E(\log p_\theta(x))$ by jointly training the encoder and the decoder.

The method 200 may be applied to the scenarios shown in FIG. 1, and certainly, may also be applied to another communication scenario. This is not limited in embodiments of this application.

In S210, the transmit end determines first data, where the first data is to-be-sent data.

In S220, the transmit end determines a first parameter based on the first data, where the first parameter includes a parameter of a probability distribution of a hidden variable, and the hidden variable is obtained by encoding the first data by using the encoder of the VAE.

Specifically, the transmit end inputs the first data into the encoder of the VAE, and the encoder encodes the first data to obtain the hidden variable of the first data. The hidden variable may be data that complies with a probability distribution. For example, the probability distribution may be a Gaussian distribution, a Bernoulli distribution, or the like. Further, the encoder calculates the first parameter, where the first parameter includes the parameter of the probability distribution of the hidden variable of the first data. For example, if the probability distribution of the hidden variable is the Gaussian distribution, the first parameter is a mean value and a variance of the Gaussian distribution. For another example, if the probability distribution of the hidden variable is the Bernoulli distribution, the first parameter is a probability of the Bernoulli distribution. A dimension of the hidden variable is not greater than a dimension of the first data. Further, the encoder outputs the first parameter.

In S230, the transmit end sends the first parameter, and correspondingly, the receive end receives the first parameter. Specifically, the transmit end may send the first parameter to the receive end through an existing channel, or may set a dedicated channel to send the first parameter to the receive end.

As an example instead of a limitation, when UE transmits CSI to a base station, a first parameter may be transmitted through an existing physical uplink control channel (PUCCH) or a physical uplink shared channel (PUSCH). Alternatively, a dedicated CSI channel may be set for transmission.

In S240, the receive end generates the probability distribution of the hidden variable based on the first parameter.

Specifically, if the first parameter is the mean value and the variance of the Gaussian distribution, the receive end may generate the Gaussian distribution based on the first parameter. If the first parameter is a probability parameter of the Bernoulli distribution, the receive end may generate the Bernoulli distribution based on the probability parameter.

In S250, the receive end samples the probability distribution for M times, to obtain M pieces of sampled data, where M is a positive integer.

Specifically, if the probability distribution is the Gaussian distribution, a normal distribution sampling method may be used. If the probability distribution is the Bernoulli distribution, even distribution sampling may be used. A sampling method is not limited in embodiments of this application.

In S260, the receive end reconstructs the first data based on the M pieces of sampled data.

In a possible implementation, in S260, that the receive end reconstructs the first data based on the M pieces of sampled data includes: the receive end separately decodes the M pieces of sampled data by using the decoder of the VAE, to obtain M pieces of second data; and the receive end determines reconstructed first data based on the M pieces of second data.

Specifically, that the receive end determines reconstructed first data based on the M pieces of second data includes: the receive end may average the M pieces of second data, and use an average result as the reconstructed first data, where specifically, an averaging manner may be any one of the following: calculating an arithmetic average, a weighted average, a geometric average, a harmonic average, or a mean square average of the M pieces of first data, and using a calculation result as the reconstructed first data.

In a possible implementation, the receive end may perform selection on the M pieces of second data, and use a selection result as the reconstructed first data. Specifically, a selection manner may be: selecting data that appears most frequently in the M pieces of second data as the reconstructed first data.

In a possible implementation, the receive end may average the M pieces of second data to obtain third data, and the receive end performs a decision on the third data, and uses a decision result as the reconstructed first data. A specific decision manner may be a hard decision.

Preferably, M is a positive integer greater than 1.

Therefore, in this embodiment of this application, the transmit end transmits the first parameter, so that the receive end can generate the probability distribution of the hidden variable based on the first parameter, to sample the probability distribution for a plurality of times, thereby reducing an amount of data transmitted over an air interface, and reducing overheads.

In a possible implementation, the method further includes: The transmit end sends second indication information, where the second indication information indicates the receive end to sample the probability distribution. Correspondingly, the receive end receives the second indication information, and samples the probability distribution based on the second indication information. A quantity of sampling times may be M.

In this case, if the transmit end determines to send the first parameter, the transmit end may send the second indication information to the receive end, to indicate the receive end to sample the probability distribution. After receiving the second indication information, the receive end may sample the probability distribution for the M times based on the second indication information.

In a possible implementation, the method further includes: The transmit end first determines a first dataset, where the first dataset includes a plurality of groups of data;

and the transmit end separately determines each group of data in the first dataset as the first data.

In a possible implementation, the method further includes: The receive end sends first indication information, where the first indication information indicates the transmit end to send the first parameter; and correspondingly, the transmit end receives the first indication information, and sends the first parameter based on the first indication information.

In a possible implementation, the first indication information may further indicate the transmit end to send the sampled data of the first parameter. The receive end may determine, based on a factor such as a processing capability of the receive end or a precision requirement for reconstructing data, that data that can be received is the first parameter or the sampled data of the first parameter, and send the first indication information to the transmit end. When the first indication information indicates the transmit end to send the sampled data of the first parameter, after the receive end receives the first indication information, the receive end and the transmit end may perform signaling interaction by using a method in the conventional technology.

As an example instead of a limitation, when UE transmits channel state information (CSI) to a base station, the base station may add first indication information to downlink control information (DCI). A quantity of bits of the first indication information is 1, and the first indication information indicates that data sent by a transmit end is a first parameter or sampled data of the first parameter. As shown in Table 1, when a bit value is 1, the indication information indicates that the CSI transmitted by a user to the base station is the first parameter; or when a bit value is 0, the indication information indicates that the CSI transmitted by a user to the base station is the sampled data of the first parameter.

TABLE 1

| Correspondence between bit values and transmitted data | |
| --- | --- |
| Bit value | Transmitted data |
| 1 | First parameter |
| 0 | Sampled data of the first parameter |

In a possible implementation, the first indication information may be replaced with a channel condition status. To be specific, the transmit end may choose, based on the channel condition status fed back by the receive end, to send the first parameter or the sampled data of the first parameter. When the transmit end receives a good channel condition fed back by the receive end, the transmit end sends the first parameter. When the transmit end receives a poor feedback channel condition, the transmit end sends the sampled data of the first parameter.

Figure 3:
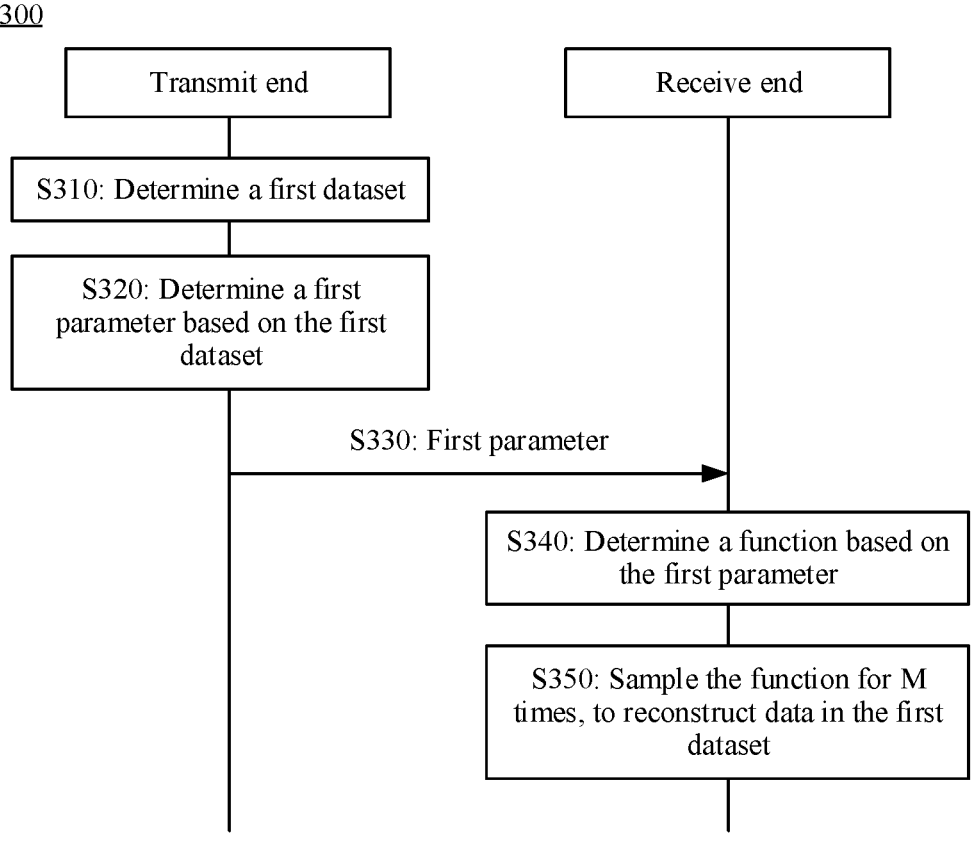
FIG. 3 is a schematic flowchart of a data transmission method according to another embodiment of this application.

FIG. 3 is a schematic flowchart of a data transmission method 300 according to another embodiment of this application.

In S310, a transmit end determines a first dataset, where the first dataset includes at least one piece of to-be-sent data.

In S320, the transmit end determines a first parameter based on the first dataset, where the first parameter includes a characteristic parameter of a function, and the function is obtained by modeling the data in the first dataset.

Specifically, the function may be a Gaussian mixture model, and the first parameter includes at least one of a mean vector, a covariance matrix, or a mixing coefficient of the Gaussian mixture model.

It should be understood that, when the transmit end models the data in the first dataset by using the Gaussian mixture model, it is first assumed that a distribution of the data in the first dataset is a mixed distribution formed by combining a plurality of multivariate Gaussian distributions, and parameters (mean values and variances) of these multivariate Gaussian distributions are unknown, and may be represented by using the following formula:

$$p(d) = \sum_{i=1}^{N} \alpha_i \cdot p\left(d \mid \mu_i, \sum_{i}\right)$$

d is a sample in the dataset, p(d) represents a probability distribution of the sample, $(\mu, \Sigma_i)$ is a mean vector and a covariance matrix of an $i^{th}$ multivariate Gaussian distribution, $\alpha_i$ is a mixing coefficient, and satisfies $$0 \le \alpha_i \le 1, \text{ and } \sum_{i=1}^{N} \alpha_i = 1.$$

After the modeling is completed, the transmit end may identify and optimize the parameters in the Gaussian mixture model by using a parameter estimation method, for example, an EM algorithm. An expectation value is maximized by updating two parameters, the mean value and the variance. This process can be iterative until parameters generated in two iterations change very little.

In a possible implementation, the function may alternatively be a generative adversarial network (GAN), and the first parameter includes at least one of a weight or a bias of the GAN.

As an unsupervised learning method, the GAN is composed of two sets of neural networks: a generator (G) and a discriminator (D). A training process of the GAN is roughly as follows: The generator G is configured to generate a false sample, and the discriminator D is configured to distinguish whether the sample generated by the generator G is real data or false data. A result of each determination is input to the G and the D as a back propagation input. If the D is correctly determined, a parameter of the G needs to be adjusted to make the generated false data more realistic. If the D is incorrectly determined, a parameter of the D needs to be adjusted to avoid a next determining error. Training continues until the two parties enter a state of equilibrium and harmony. An ultimate goal of the GAN model is to obtain a generator with high quality and a discriminator with a strong determining ability. After the training is completed, parameters of the two neural networks, the G and the D, are determined, and the generator G may be used to reconstruct original data.

It should be understood that, when modeling is performed on the data in the first dataset by using the GAN, the first parameter is obtained by training the data in the dataset by using the GAN model.

In S330, the transmit end sends the first parameter, and correspondingly, a receive end receives the first parameter.

In S340, the receive end determines the function based on the first parameter.

In a possible implementation, after the receive end receives the first parameter, the receive end determines the Gaussian mixture model based on the mean value and the variance in the first parameter.

In a possible implementation, after receiving the first parameter, the receive end determines the GAN based on the weight and the bias in the first parameter.

In S350, the receive end samples the function for M times, to reconstruct the data in the first dataset, where M is a positive integer.

In a possible implementation, the receive end samples the Gaussian mixture model for M times to obtain M pieces of sampled data, and the receive end uses the M pieces of sampled data as reconstructed data in the first dataset.

In a possible implementation, when the receive end samples the GAN network to obtain M pieces of sampled data, the receive end uses the M pieces of sampled data as the reconstructed data in the first dataset.

Therefore, in this embodiment of this application, a first parameter is transmitted, so that a receive end can determine a function based on the first parameter, sample the function for a plurality of times, and use data sampled for the plurality of times as reconstructed data in a first dataset. Therefore, original data does not need to be transmitted, and overheads can be reduced.

Preferably, in S350, M is greater than 1.

As a possible implementation, in S330, the first parameter further includes a quantity N of pieces of data in the first dataset, where M may be a multiple of N, or M may be less than N, and N is a positive integer.

In this case, a transmit end may send a quantity of pieces of original data, and a quantity of pieces of data generated by a receive end is a multiple of the quantity of pieces of original data. In this way, the data can be better used for training.

In a possible implementation, the method 300 further includes: The receive end sends first indication information to the transmit end, where the first indication information indicates the transmit end to send the first parameter; and correspondingly, the transmit end receives the first indication information, and sends the first parameter based on the first indication information.

In a possible implementation, before S310, that is, before the transmit end determines the first dataset, the method 300 further includes: the transmit end determines a second dataset, where the second dataset includes at least one piece of to-be-sent data; the transmit end clusters the data in the second dataset to obtain S data subsets, where S is a positive integer; and the transmit end separately determines the S data subsets as the first dataset.

As an example instead of a limitation, a clustering method may be K-means clustering, mean shift clustering, a density-based clustering method, or the like.

In other words, the transmit end may cluster the to-be-sent data in the second dataset based on a status of the data in the second dataset, and then separately determine the clustered data as the first dataset. In this way, accuracy of sampling by the receive end can be further improved while transmission resources are saved.

In a possible implementation, the method 300 further includes: The transmit end sends at least one piece of first data; and correspondingly, the receive end receives the at least one piece of first data.

In this embodiment of this application, the data received by the receive end further includes some data in the first dataset. The receive end uses the data and the data obtained by the receive end through sampling as a real sample for neural network training. In this way, authenticity of a training result can be improved.

In a possible implementation, S320 in the method 300 may alternatively be implemented at the receive end. Specifically, the transmit end selects a small amount of data in the first dataset as a third dataset, and the transmit end sends the data in the third dataset. Correspondingly, the receive end receives the data in the third dataset, the receive end determines the first parameter based on the third dataset, and the receive end stores the first parameter. When a large amount of data needs to be used, the receive end generates the large amount of data based on the first parameter. For a specific method for determining the first parameter and a method for generating data by using the first parameter, refer to S320, S340, and S350 in the method 300.

In this embodiment of this application, the transmit end may alternatively send only a small amount of first data, and the receive end receives the small amount of first data, determines a first parameter based on the data at the receive end, and then generates a large amount of data based on the data. In this way, space occupied for data transmission and storage can be reduced. Therefore, a method for determining the first parameter and a method for using the first parameter in this application may also be used by the receive end at the same time. This is not limited in this application.

Figure 4:
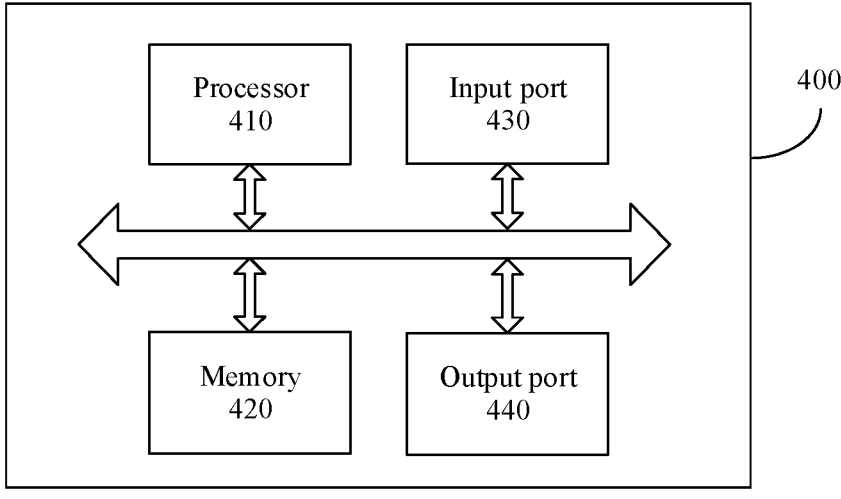
FIG. 4 is a schematic block diagram of an example of a data transmission apparatus according to this application.

According to the foregoing method, FIG. 4 is a schematic diagram of a data transmission apparatus 400 according to an embodiment of this application.

The apparatus 400 may be a terminal device, or may be a network device, or may be a chip or a circuit, for example, a chip or a circuit that may be disposed in a terminal device.

The apparatus 400 may include a processing unit 410 (namely, an example of a processing unit). In a possible implementation, the apparatus 400 may further include a storage unit 420. The storage unit 420 is configured to store instructions.

In a possible manner, the processing unit 410 is configured to execute the instructions stored in the storage unit 420, so that the apparatus 400 implements the steps performed by the receive end in the foregoing method.

Further, the apparatus 400 may further include an input port 430 (namely, an example of a communication unit) and an output port 440 (namely, another example of the communication unit). Further, the processing unit 410, the storage unit 420, the input port 430, and the output port 440 may communicate with each other through an internal connection path, to transfer a control signal and/or a data signal. The storage unit 420 is configured to store a computer program. The processing unit 410 may be configured to invoke the computer program from the storage unit 420 and run the computer program to complete the steps of the receive end in the foregoing method. The storage unit 420 may be integrated into the processing unit 410, or may be disposed separately from the processing unit 410.

In a possible manner, the input port 430 may be a receiver, and the output port 440 is a transmitter. The receiver and the transmitter may be a same physical entity or different physical entities. When the receiver and the transmitter are a same physical entity, the receiver and the transmitter may be collectively referred to as a transceiver.

In a possible manner, the input port 430 is an input interface, and the output port 440 is an output interface.

As an implementation, it may be considered that functions of the input port 430 and the output port 440 are implemented by using a transceiver circuit or a dedicated transceiver chip. It may be considered that the processing unit 410 is implemented by using a dedicated processing chip, a processing circuit, a processing unit, or a general-purpose chip.

As another implementation, it may be considered that the communication device (e.g., the receive end) provided in embodiments of this application may be implemented by using a general-purpose computer. To be specific, program code for implementing functions of the processing unit 410, the input port 430, and the output port 440 is stored in the storage unit 420, and a general-purpose processing unit executes the code in the storage unit 420 to implement the functions of the processing unit 410, the input port 430, and the output port 440.

In an implementation, the input port 430 is configured to receive a first parameter, where the first parameter includes a parameter of a probability distribution of a hidden variable, and the hidden variable is obtained by encoding first data by using an encoder of a variational auto-encoder.

The processing unit 410 is configured to: determine the probability distribution based on the first parameter; sample the probability distribution for M times, to obtain M pieces of sampled data, where M is a positive integer; and reconstruct the first data based on the M pieces of sampled data.

In a possible implementation, the output port 440 is configured to send first indication information, where the first indication information indicates the transmit end to send the first parameter.

In a possible implementation, the input port 430 is further configured to receive second indication information, where the second indication information indicates the receive end to sample the probability distribution.

In a possible implementation, the storage unit 420 is configured to store the first parameter.

Functions and actions of the modules or units in the apparatus 400 listed above are merely examples for description. When the apparatus 400 is configured in or is a receive end, the modules or units in the apparatus 400 may be configured to perform the actions or processing processes performed by the receive end in the foregoing method. Herein, to avoid repetition, detailed descriptions are omitted.

For concepts, explanations, detailed descriptions, and other steps of the apparatus 400 that are related to the technical solutions provided in embodiments of this application, refer to the descriptions of the content in the foregoing method or other embodiments. Details are not described herein again.

Figure 5:
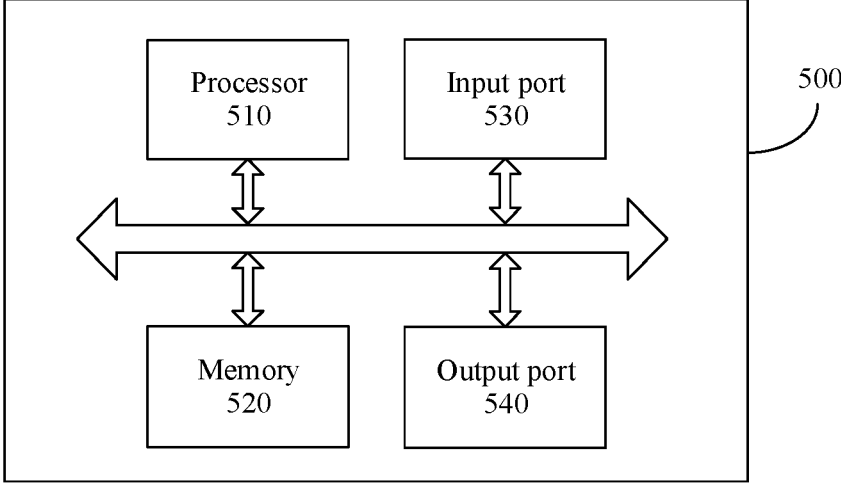
FIG. 5 is a schematic block diagram of another example of a data transmission apparatus according to this application.

According to the foregoing method, FIG. 5 is a schematic diagram of a data transmission apparatus 500 according to an embodiment of this application.

The apparatus 500 may be a terminal device, or may be a network device, or may be a chip or a circuit, for example, a chip or a circuit that may be disposed in an access device.

The apparatus 500 may include a processing unit 510 (namely, an example of a processing unit) and a storage unit 520. The storage unit 520 is configured to store instructions.

The processing unit 510 is configured to execute the instructions stored in the storage unit 520, so that the apparatus 500 implements the steps performed by the access device in the foregoing method.

Further, the apparatus 500 may further include an input port 530 (namely, an example of a communication unit) and an output port 540 (namely, another example of the communication unit). Further, the processing unit 510, the storage unit 520, the input port 530, and the output port 540 may communicate with each other through an internal connection path, to transfer a control signal and/or a data signal. The storage unit 520 is configured to store a computer program. The processing unit 510 may be configured to invoke the computer program from the storage unit 520 and run the computer program, to control the input port 530 to receive a signal, and control the output port 540 to send a signal, so as to complete the steps of the terminal device in the foregoing method. The storage unit 520 may be integrated into the processing unit 510, or may be disposed separately from the processing unit 510.

In a possible implementation, if the apparatus 500 is a communication device (e.g., a transmit end), the input port 530 is a receiver, and the output port 540 is a transmitter. The receiver and the transmitter may be a same physical entity or different physical entities. When the receiver and the transmitter are a same physical entity, the receiver and the transmitter may be collectively referred to as a transceiver.

In a possible implementation, if the apparatus 500 is a chip or a circuit, the input port 530 is an input interface and the output port 540 is an output interface.

As an implementation, it may be considered that functions of the input port 530 and the output port 540 are implemented by using a transceiver circuit or a dedicated transceiver chip. It may be considered that the processing unit 510 is implemented by using a dedicated processing chip, a processing circuit, a processing unit, or a general-purpose chip.

As another implementation, it may be considered that the communication device (e.g., the transmit end) provided in embodiments of this application may be implemented by using a general-purpose computer. To be specific, program code for implementing functions of the processing unit 510, the input port 530, and the output port 540 is stored in the storage unit 520, and a general-purpose processing unit executes the code in the storage unit 520 to implement the functions of the processing unit 510, the input port 530, and the output port 540.

In an implementation, the processing unit 510 is configured to: determine a first dataset; and determine a first parameter based on the first data, where the first parameter includes a parameter of a probability distribution of a hidden variable, and the hidden variable is obtained by encoding the first data by using an encoder of a variational auto-encoder.

The output port 540 is configured to send the first parameter.

In a possible implementation, the input port 530 is configured to receive first indication information, where the first indication information indicates the transmit end to send the first parameter.

In a possible implementation, the output port 540 is further configured to send second indication information, where the second indication information indicates the receive end to sample the probability distribution.

In a possible implementation, the storage unit 520 is configured to store the first parameter.

Functions and actions of the modules or units in the apparatus 500 listed above are merely examples for description. When the apparatus 500 is configured in or is the access device, the modules or units in the apparatus 500 may be configured to perform the actions or processing processes performed by the access device in the foregoing method. Herein, to avoid repetition, detailed descriptions thereof are omitted.

For concepts, explanations, detailed descriptions, and other steps of the apparatus 500 that are related to the technical solutions provided in embodiments of this application, refer to the descriptions of the content in the foregoing method or other embodiments. Details are not described herein again.

Figure 6:
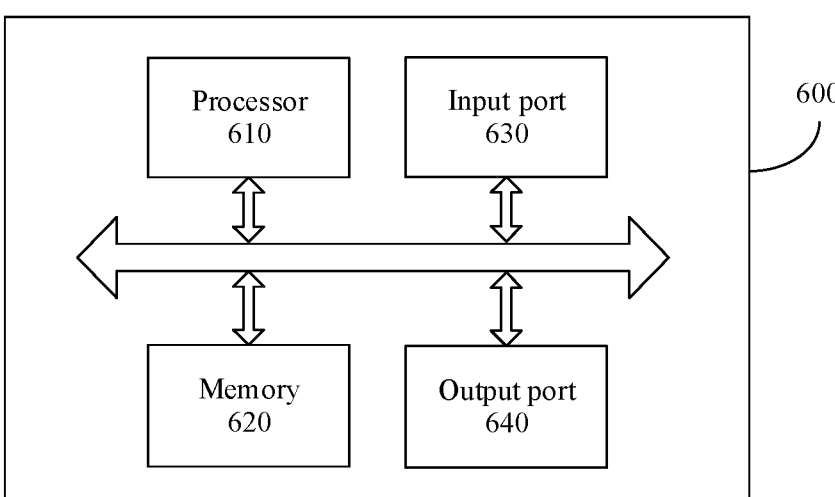
FIG. 6 is a schematic block diagram of another example of a data transmission apparatus according to this application.

According to the foregoing method, FIG. 6 is a schematic diagram of a data transmission apparatus 600 according to an embodiment of this application.

The apparatus 600 may be a terminal device, or may be a network device, or may be a chip or a circuit, for example, a chip or a circuit that may be disposed in a terminal device.

The apparatus 600 may include a processing unit 610 (namely, an example of a processing unit). In a possible implementation, the apparatus 600 may further include a storage unit 620. The storage unit 620 is configured to store instructions.

In a possible manner, the processing unit 610 is configured to execute the instructions stored in the storage unit 620, so that the apparatus 600 implements the steps performed by the receive end in the foregoing method.

Further, the apparatus 600 may further include an input port 630 (namely, an example of a communication unit) and an output port 640 (namely, another example of the communication unit). Further, the processing unit 610, the storage unit 620, the input port 630, and the output port 640 may communicate with each other through an internal connection path, to transfer a control signal and/or a data signal. The storage unit 620 is configured to store a computer program. The processing unit 610 may be configured to invoke the computer program from the storage unit 620 and run the computer program to complete the steps of the receive end in the foregoing method. The storage unit 620 may be integrated into the processing unit 610, or may be disposed separately from the processing unit 610.

In a possible manner, the input port 630 may be a receiver, and the output port 640 is a transmitter. The receiver and the transmitter may be a same physical entity or different physical entities. When the receiver and the transmitter are a same physical entity, the receiver and the transmitter may be collectively referred to as a transceiver.

In a possible manner, the input port 630 is an input interface, and the output port 640 is an output interface.

As an implementation, it may be considered that functions of the input port 630 and the output port 640 are implemented by using a transceiver circuit or a dedicated transceiver chip. It may be considered that the processing unit 610 is implemented by using a dedicated processing chip, a processing circuit, a processing unit, or a general-purpose chip.

As another implementation, it may be considered that the communication device (e.g., the receive end) provided in embodiments of this application may be implemented by using a general-purpose computer. To be specific, program code for implementing functions of the processing unit 610, the input port 630, and the output port 640 is stored in the storage unit 620, and a general-purpose processing unit executes the code in the storage unit 620 to implement the functions of the processing unit 610, the input port 630, and the output port 640.

In an implementation, the input port 630 is configured to receive a first parameter, where the first parameter includes a characteristic parameter of a function, the function is obtained by modeling data in the first dataset, and the first dataset includes at least one piece of to-be-sent data.

The processing unit 610 is configured to: determine the function based on the first parameter; and sample the function for M times, to reconstruct the data in the first dataset, where M is a positive integer.

In a possible implementation, the input port 630 is configured to receive first indication information, where the first indication information indicates the transmit end to send the first parameter.

In a possible implementation, the storage unit 620 is configured to store the first parameter.

Functions and actions of the modules or units in the apparatus 600 listed above are merely examples for description. When the apparatus 600 is configured in or is a receive end, the modules or units in the apparatus 600 may be configured to perform the actions or processing processes performed by the receive end in the foregoing method. Herein, to avoid repetition, detailed descriptions are omitted.

For concepts, explanations, detailed descriptions, and other steps of the apparatus 600 that are related to the technical solutions provided in embodiments of this application, refer to the descriptions of the content in the foregoing method or other embodiments. Details are not described herein again.

Figure 7:
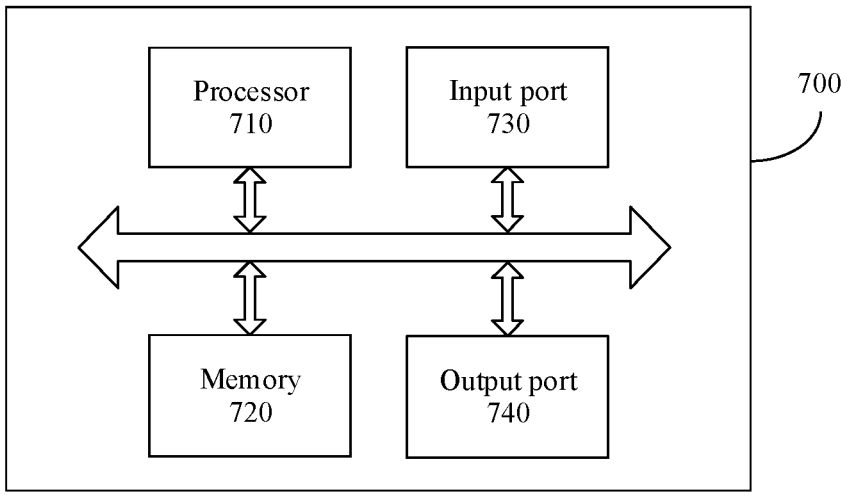
FIG. 7 is a schematic block diagram of another example of a data transmission apparatus according to this application.

According to the foregoing method, FIG. 7 is a schematic diagram of a data transmission apparatus 700 according to an embodiment of this application.

The apparatus 700 may be a terminal device, or may be a network device, or may be a chip or a circuit, for example, a chip or a circuit that may be disposed in a terminal device.

The apparatus 700 may include a processing unit 710 (namely, an example of a processing unit). In a possible implementation, the apparatus 700 may further include a storage unit 720. The storage unit 720 is configured to store instructions.

In a possible manner, the processing unit 710 is configured to execute the instructions stored in the storage unit 720, so that the apparatus 700 implements the steps performed by the receive end in the foregoing method.

Further, the apparatus 700 may further include an input port 730 (namely, an example of a communication unit) and an output port 740 (namely, another example of the communication unit). Further, the processing unit 710, the storage unit 720, the input port 730, and the output port 740 may communicate with each other through an internal connection path, to transfer a control signal and/or a data signal. The storage unit 720 is configured to store a computer program. The processing unit 710 may be configured to invoke the computer program from the storage unit 720 and run the computer program to complete the steps of the receive end in the foregoing method. The storage unit 720 may be integrated into the processing unit 710, or may be disposed separately from the processing unit 710.

In a possible manner, the input port 730 may be a receiver, and the output port 740 is a transmitter. The receiver and the transmitter may be a same physical entity or different physical entities. When the receiver and the transmitter are a same physical entity, the receiver and the transmitter may be collectively referred to as a transceiver.

In a possible manner, the input port 730 is an input interface, and the output port 740 is an output interface.

As an implementation, it may be considered that functions of the input port 730 and the output port 740 are implemented by using a transceiver circuit or a dedicated transceiver chip. It may be considered that the processing unit 710 is implemented by using a dedicated processing chip, a processing circuit, a processing unit, or a general-purpose chip.

As another implementation, it may be considered that the communication device (e.g., the transmit end) provided in embodiments of this application may be implemented by using a general-purpose computer. To be specific, program code for implementing functions of the processing unit 710, the input port 730, and the output port 740 is stored in the storage unit 720, and a general-purpose processing unit executes the code in the storage unit 720 to implement the functions of the processing unit 710, the input port 730, and the output port 740.

In an implementation, the processing unit 710 is configured to: determine a first dataset, where the first dataset includes at least one piece of to-be-sent data; and determine a first parameter based on the first dataset, where the first parameter includes a characteristic parameter of a function, and the function is obtained by modeling the data in the first dataset.

The output port 740 is configured to send the first parameter.

In a possible implementation, the storage unit 720 is configured to store the first parameter.

In a possible implementation, the input port 730 is configured to receive first indication information, where the first indication information indicates the transmit end to send the first parameter.

In a possible implementation, the processing unit 710 is further configured to: determine a second dataset, where the second dataset includes at least one piece of to-be-sent data; cluster the data in the second dataset to obtain S data subsets, where S is a positive integer; and separately determine the S data subsets as the first dataset.

In a possible implementation, the storage unit 720 is configured to store the first parameter.

Functions and actions of the modules or units in the apparatus 700 listed above are merely examples for description. When the apparatus 700 is configured in or is a receive end, the modules or units in the apparatus 700 may be configured to perform the actions or processing processes performed by the receive end in the foregoing method. Herein, to avoid repetition, detailed descriptions are omitted.

For concepts, explanations, detailed descriptions, and other steps of the apparatus 700 that are related to the technical solutions provided in embodiments of this application, refer to the descriptions of the content in the foregoing method or other embodiments. Details are not described herein again.

According to the method in embodiments of this application, an embodiment of this application further provides a communication system, including the transmit end and the receive end described above.

It should be understood that, the processor in embodiments of this application may be a central processing unit (CPU), or may be another general-purpose processor, a digital signal processor (digital signal processor, DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through an example rather than a limitative description, random access memories (random access memories, RAMs) in many forms may be used, for example, a static random access memorystatic RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware, firmware, or any combination thereof. When the software is used to implement embodiments, all or some of the foregoing embodiments may be implemented in a form of a computer program product. The computer program product includes one or more computer instructions or computer programs. When the computer instructions or the computer programs are loaded or executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), or a semiconductor medium. The semiconductor medium may be a solid-state drive.

It should be understood that the term "and/or" in this specification describes only an association relationship between associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments. Details are not described herein again. In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments. In addition, function units in embodiments of this application may be integrated into one processing unit, each of the units may exist alone physically, or two or more units are integrated into one unit. When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method carried out by a receive end, the method comprising:
receiving a first parameter, wherein the first parameter comprises a parameter of a probability distribution of a hidden variable, and the hidden variable is obtained by encoding first data by using an encoder of a variational auto-encoder;
determining the probability distribution based on the first parameter;
sampling the probability distribution for M times, to obtain M pieces of sampled data, wherein M is a positive integer; and
reconstructing the first data based on the M pieces of sampled data,
wherein the reconstructing the first data based on the M pieces of sampled data comprises:
separately decoding the M pieces of sampled data by using a decoder of the variational auto-encoder, to obtain M pieces of second data; and determining reconstructed first data based on the M pieces of second data, wherein the determining reconstructed first data based on the M pieces of second data comprises performing at least one operation from the group consisting of:

averaging the M pieces of second data, and using an averaging result as the reconstructed first data;

performing selection on the M pieces of second data, and using a selection result as the reconstructed first data; and averaging the M pieces of second data to obtain third data, performing a decision on the third data, and using a decision result as the reconstructed first data.

2. The method according to claim 1, wherein before the receiving a first parameter, the method further comprises:

sending first indication information that indicates to a transmit end to send the first parameter.

3. The method according to claim 1, wherein the method further comprises:

receiving second indication information that indicates to the receive end to sample the probability distribution, and wherein the sampling the probability distribution for M times comprises sampling the probability distribution for the M times based on the second indication information.

4. A receive end comprising:

a processor; and a non-transitory computer-readable medium including computer-executable instructions that, when executed by the processor, facilitate carrying out a data transmission method comprising:

receiving a first parameter, wherein the first parameter comprises a parameter of a probability distribution of a hidden variable, and the hidden variable is obtained by encoding first data by using an encoder of a variational auto-encoder;

determining the probability distribution based on the first parameter;

sampling the probability distribution for M times, to obtain M pieces of sampled data, wherein M is a positive integer; and reconstructing the first data based on the M pieces of sampled data, wherein the reconstructing the first data based on the M pieces of sampled data comprises:

separately decoding the M pieces of sampled data by using a decoder of the variational auto-encoder, to obtain M pieces of second data; and determining reconstructed first data based on the M pieces of second data, wherein the determining reconstructed first data based on the M pieces of second data comprises performing at least one operation from the group consisting of:

averaging the M pieces of second data, and using an averaging result as the reconstructed first data;

performing selection on the M pieces of second data, and using a selection result as the reconstructed first data; and averaging the M pieces of second data to obtain third data, performing a decision on the third data, and using a decision result as the reconstructed first data.

5. The receive end according to claim 4, wherein before the receiving a first parameter, the method further comprises:

sending first indication information that indicates to a transmit end to send the first parameter.

6. The receive end according to claim 4, wherein the method further comprises:

receiving second indication information that indicates to the receive end to sample the probability distribution, and wherein the sampling the probability distribution for M times comprises sampling the probability distribution for the M times based on the second indication information.

* * * * *